United States Patent
Inciong et al.

(10) Patent No.: US 7,293,779 B2
(45) Date of Patent: *Nov. 13, 2007

(54) MLS GASKET WITH BORE EDGE STOPPER BEAD

(75) Inventors: Josefino T. Inciong, Skokie, IL (US); William A. Johnson, Naperville, IL (US)

(73) Assignee: Dana Corporation, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/504,650

(22) PCT Filed: Feb. 14, 2003

(86) PCT No.: PCT/US03/04789

§ 371 (c)(1),
(2), (4) Date: Jan. 7, 2005

(87) PCT Pub. No.: WO03/071114

PCT Pub. Date: Aug. 28, 2003

(65) Prior Publication Data

US 2005/0225036 A1    Oct. 13, 2005

(51) Int. Cl.
*F02F 11/00*    (2006.01)
(52) U.S. Cl. .................. 277/594; 277/592; 277/593
(58) Field of Classification Search ........ 277/592–596, 277/600, 601
See application file for complete search history.

(56) References Cited

U.S. PATENT DOCUMENTS

| 843,394 | A |   | 2/1907  | Haynes |
|---|---|---|---|---|
| 3,843,141 | A | * | 10/1974 | Kuhn .......................... 277/595 |
| 4,468,044 | A | * | 8/1984  | Ulmer et al. ............... 277/596 |
| 4,867,462 | A |   | 9/1989  | Udagawa |
| 5,078,413 | A | * | 1/1992  | Miyaoh ...................... 277/595 |
| 5,255,927 | A |   | 10/1993 | Miyaoh |
| 5,286,039 | A |   | 2/1994  | Kawaguchi et al. |
| 5,294,135 | A |   | 3/1994  | Kubouchi et al. |
| 5,306,023 | A | * | 4/1994  | Udagawa .................... 277/601 |
| 5,408,963 | A |   | 4/1995  | Miyaoh et al. |
| 5,460,387 | A |   | 10/1995 | Miyaoh et al. |
| 5,522,604 | A |   | 6/1996  | Weiss et al. |
| 5,586,776 | A |   | 12/1996 | Kubouchi et al. |
| 5,642,893 | A | * | 7/1997  | Udagawa .................... 277/592 |

(Continued)

OTHER PUBLICATIONS

PCT International Search Report issued Sep. 21, 2005.

*Primary Examiner*—Patricia Engle
*Assistant Examiner*—Gilbert Lee
(74) *Attorney, Agent, or Firm*—Marshall & Melhorn LLC

(57) ABSTRACT

A gasket includes an intermediate layer having resilient sealing beads flanked by stopper beads. The three-layer gasket, particularly designed for heavy duty racing engines, provides a relatively robust cross-section in web-areas between cylinder bore apertures. A thin bottom layer includes wrap-around flanged portions extending about cylinder bore edges of the intermediate layer to partially overlap cylinder bore aperture areas of that layer. The flanged portions may include a plurality of waves to increase forces to generate the seal. A thin top layer overlies the intermediate layer, as well as the overlapping portions of the bottom layer. In one described embodiment, the overlapping portions are limited to cylinder bore edges between cylinder bores. As a between-engine-overhaul indication of engine health, the top gasket layer is adapted via plastic deformation to form a permanent indentation in an aluminum cylinder head to signal excessive engine operation.

17 Claims, 2 Drawing Sheets

U.S. PATENT DOCUMENTS

| | | |
|---|---|---|
| 5,785,322 A | 7/1998 | Suggs et al. |
| 5,791,659 A | 8/1998 | Takada et al. |
| 5,879,011 A * | 3/1999 | Takata et al. ............... 277/593 |
| 5,951,021 A * | 9/1999 | Ueta ......................... 277/593 |
| 6,105,971 A | 8/2000 | Hasegawa |
| 6,164,662 A | 12/2000 | Uemura et al. |
| 6,457,724 B2 * | 10/2002 | Ogaeri et al. ............... 277/595 |
| 6,540,234 B1 * | 4/2003 | Atkinson et al. ............ 277/612 |
| 6,607,830 B2 * | 8/2003 | Murakami et al. .......... 428/422 |

* cited by examiner

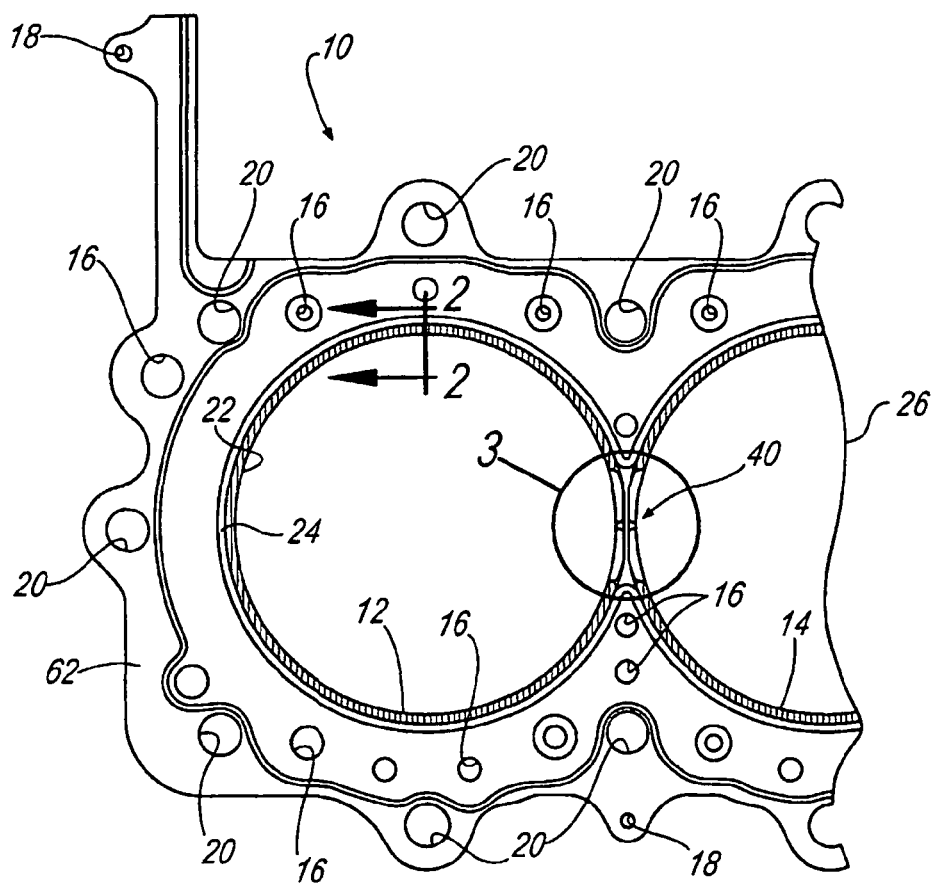
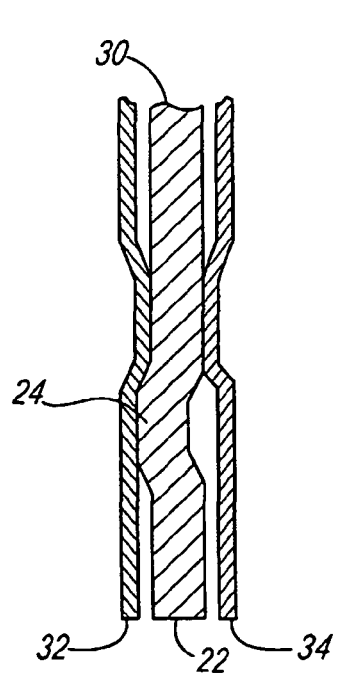
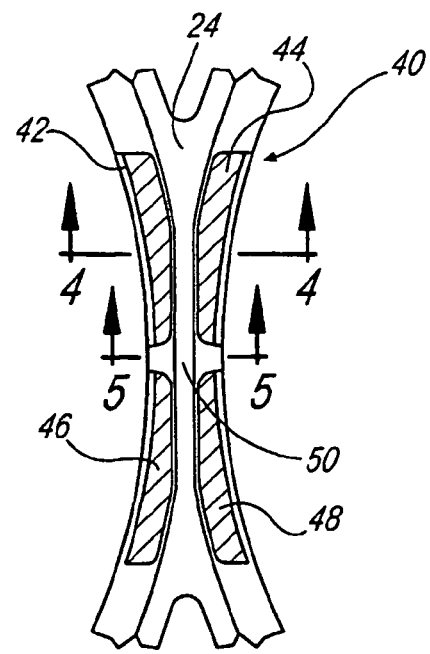
FIG. 1
FIG. 2
FIG. 3

MLS GASKET WITH BORE EDGE STOPPER BEAD

BACKGROUND OF THE INVENTION

1. Field of the Invention

The present invention relates to improvements in multi-layered steel (MLS) cylinder head gaskets for automotive internal combustion engines, including gaskets having stopper layers situated closely adjacent to combustion cylinder bore edges, and particularly for providing enhanced sealing between combustion cylinder bores.

2. Description of the Prior Art

Those skilled in the art will appreciate the issues involved in maintaining a high quality seal between cylinder apertures of a cylinder block in an internal combustion engine and a cylinder head fastened to the block. In recent years, MLS cylinder head gaskets have become a preferred design choice, wherein all (typically at least three) gasket layers have been formed of steel. Beaded exterior layers have generally been fabricated of 301 stainless steel, a relatively robust metal with a high spring rate for meeting requisite performance requirements over a useful gasket life. The center layer, also called a "spacer" layer, has generally been formed of less robust metals, such as 409 stainless steel, or in some cases even zinc-plated or plain low carbon steels, for meeting less rigorous operating requirements.

It is desirable that areas immediately adjacent circumferential edges of engine cylinder bores be subject to considerably greater stresses for assuring proper sealing than areas of the gasket radially remote from the apertures. To meet the greater stress requirements at the bore edge areas, so-called stopper layers have been employed in areas that circumferentially surround each cylinder bore. The stopper layers are purposefully designed to provide increased sealing pressures around the noted areas surrounding the combustion apertures. In some cases the stoppers have been formed of extra layers of metal, consisting either of layers folded over or under primary sealing layers. In other cases, the stoppers have been formed as layers separately provided, e.g., discrete annular rings positioned about the aperture boundaries.

Still in other cases, embossed resilient sealing beads are employed in duplicate mirror image exterior sealing layers. In some instances, beaded exterior sealing layers have been prone to cracking at the boundaries of the beads, particularly in narrow web regions between cylinder bores. In small area regions, high stress dynamics can create stresses on the beads that can exceed bead deflection stress capabilities. Resultant cold working and associated bead cracking are issues seriously detrimental to both the performance and longevity of gaskets that otherwise provide reliable combustion sealing media. An improved resilient sealing bead structure would be welcomed by the industry; particularly, one having a web area stopper structure designed to maintain adequate pre-stresses within the bolted joint during useful life of the gasket with lower risks of bead cracking.

SUMMARY OF THE INVENTION

The disclosed invention is a gasket formed of a plurality of attached layers with each layer having an aperture. The apertures of each layer align with apertures of adjacent layers. In particular, the gasket is formed of three layers including an intermediate layer, a bottom layer and a top layer. The bottom layer has wrap-around flanged portions extending about the aperture edges so as to overlap an upper surface of the intermediate layer immediately adjacent the apertures of the intermediate layer. The top layer overlies the intermediate layer, as well as the overlapping flanged portions of the bottom layer.

BRIEF DESCRIPTION OF THE DRAWINGS

FIG. 1 is a plan view of a fragmentary portion of one described embodiment of an MLS cylinder head gasket adapted to surround and seal a plurality of engine cylinder bore apertures; this view depicts a highlighted area of reduced thickness between cylinder bore apertures of the gasket.

FIG. 2 is a cross-sectional view of layers of the gasket of FIG. 1, taken along lines 2-2 of FIG. 1.

FIG. 3 is an enlarged view of integral overlapping metallic stopper layers of the gasket, showing the stopper layers flanking a portion of the resilient sealing bead of the intermediate layer representatively situated within the reduced thickness web area between cylinder bore apertures of the gasket.

DETAILED DESCRIPTION OF THE EMBODIMENTS

Figure 4A:
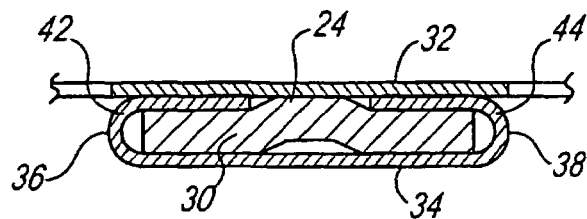
FIG. 4A is a cross-sectional view of a first embodiment of overlapping integral stopper layers of the gasket, shown along lines 4-4 of FIG. 3.

Referring initially to FIG. 1, a fragmentary portion of a metal cylinder head gasket 10 is shown. In the described embodiment, the gasket 10 includes a plurality of layers of steel, and is generally referred to as a multi-layered steel (MLS) gasket.

Among significant variables involved in successful combustion gas sealing between engine blocks and cylinder heads, a variety of nonlinear variables impact the design of a gasket. Generally the engine areas and surfaces to be sealed are rarely uniform in size or shape. As a result, the attachment bolt locations are often non-symmetrically arranged or positioned about the areas of the gasket to be secured.

One particular area affected by the described asymmetrical relationships is the so-called web or inter-bore region, i.e., the area between any two combustion cylinder bore apertures. Not only do these areas have nonlinear shapes, but they present a particular challenge for achieving adequate pressure patterns about the circumference of each of the cylinder bores required to be sealed. For each particular gasket geometry, a designer's challenge is to establish proper balance between placement of resilient sealing beads and associated stopper layers that flank such beads to limit amounts of compression of the beads. The challenge to avoid bead over-compression becomes even greater when the service requirements are more demanding, as for example those associated with racing engines.

This invention provides an improved mechanism for assuring that appropriate sealing bead compression limits are applied via judicious placement of stopper layers, in a manner that is both efficient with respect to manufacturing, as well as in a manner designed to avoid premature failure of metallic, trough-style, resilient sealing beads that surround the combustion cylinder bore apertures of many MLS gaskets.

Referring to FIG. 1, a gasket 10, depicted fragmentarily, is adapted to be secured between a cylinder head and an engine block (neither shown). A plurality of cylinder bore apertures 12 and 14 are adapted to seal between respective associated cylinder bores of an engine. As the gasket 10 is shown only fragmentarily, a jagged boundary edge 26 is depicted, at the right of which would normally be additional cylinder bore apertures, not shown.

The gasket 10 includes a plurality of apertures in addition to the cylinder bore apertures 12 and 14; thus, water and oil apertures 16, grommet apertures 18 (for attaching the multiple layers of the gasket together), and bolt hole apertures 20 (adapted for securing the gasket in place between the engine block and cylinder head), are also provided. Several other unnumbered apertures represent apertures for coolant and bypass gases, as will be appreciated by those skilled in the art.

The cylinder bore aperture 12, described herein representatively of like apertures of the gasket 10, includes a circular boundary edge 22 that fully circumscribes the aperture 12. Referring also to FIG. 2, a cross-section of the edge 22 of the aperture 12 is shown in greater detail, and includes a beaded intermediate layer 30 containing a resilient bead 24 slightly offset from the edge 22. The bead 24 is spaced from but surrounds the entire circular edge 22 of the aperture 12.

The intermediate layer 30 is a relatively thick metal layer, and is generally called a spacer layer. The layer 30 is sandwiched between a top layer 32 and a bottom layer 34; the latter are both relatively thin in comparison with the layer 30.

Referring now to FIG. 3, an encircled web area 40 (see arrow 3 of FIG. 1) is displayed in an enlarged detailed view. The area 40 is a narrow web region between cylinder bore apertures 12 and 14, having a relatively small dimension, and thus giving rise to a traditionally difficult sealing challenge. Those skilled in the art will appreciate the difficulty of sealing this particular area within an engine.

Figure 4B:
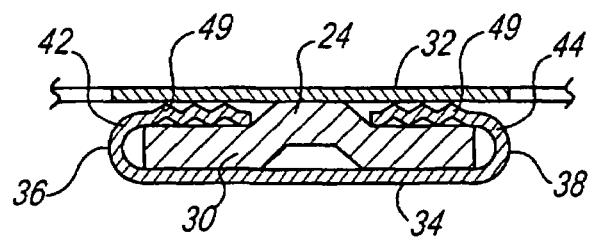
FIG. 4B is a cross-sectioned view of a second embodiment of overlapping integral stopper layers of the gasket, shown along lines 4-4 of FIG. 3.

Referring now also to FIGS. 4A-4B, a plurality of stopper pads 42, 44, 46, 48 are formed integral with the bottom layer 34 to define overlapped areas of the intermediate layer 30. For this purpose, the bottom layer 34 includes folded-over or wrap-around flange portions 36, 38 that extend upwardly to partly overlap the top surface of the intermediate layer 30. Each of the pads terminates at and flanks the resilient bead 24; the pads act collectively as a stopper to prevent the bead 24 from being fully compressed.

A first embodiment of flange portions 36, 38 is shown in FIG. 4A. The bottom layer 34 and flange portions 36, 38 have a generally uniform thickness. Additionally, the bottom layer 34 and flange portions 36, 38 are generally flat.

A second embodiment of flange portions 36, 38 as shown in FIG. 4B. Again the bottom layer 34 and flange portions 36, 38 have a generally uniform thickness. However, the flange layer includes at least one wave 49. The wave 49 is a projection that extends linearly outward from the generally flat surface of the bottom layer. As shown in FIG. 4B the wave 49 may include a plurality of projections that repeat in a generally cyclic pattern. However, the quantity, shape, or spacing of the projections may be altered depending upon the particular application of the gasket 10. The inclusion of the wave 49 in the flange portions 36, 38 increases cumulative forces, or "standover," to generate a seal between the cylinder bore apertures 12, 14.

Figure 5:
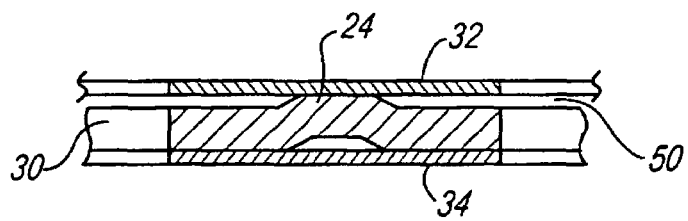
FIG. 5 is a cross-sectional view of a portion of the same gasket, shown along lines 5-5 of FIG. 3.

Referring now to FIGS. 3 and 5, a spacing 50 is shown situated between the top layer 32 and the intermediate layer 30. Referring specifically to FIG. 3, the spacing 50 overlies a portion of the web region 40 that is not padded. The spacing 50 represents the geometric center between the cylinder apertures 12 and 14, wherein the web area 40 is so narrow that no padding was applied as a matter of tooling limitations. However, the pads 42, 44, 46, and 48 have been determined to be sufficient for limiting compressibility of the resilient bead 24. Nonetheless, the scope of the present invention, despite tooling limitations which in the future may be readily overcome, fully encompasses either a multi-pad structure in the nature described, or a contiguous pad structure of a type wherein pads 42 and 46, and 44 and 48, are respectively combined to provide unitary structures (not shown) that flank opposite sides of the bead 24.

Figure 6:
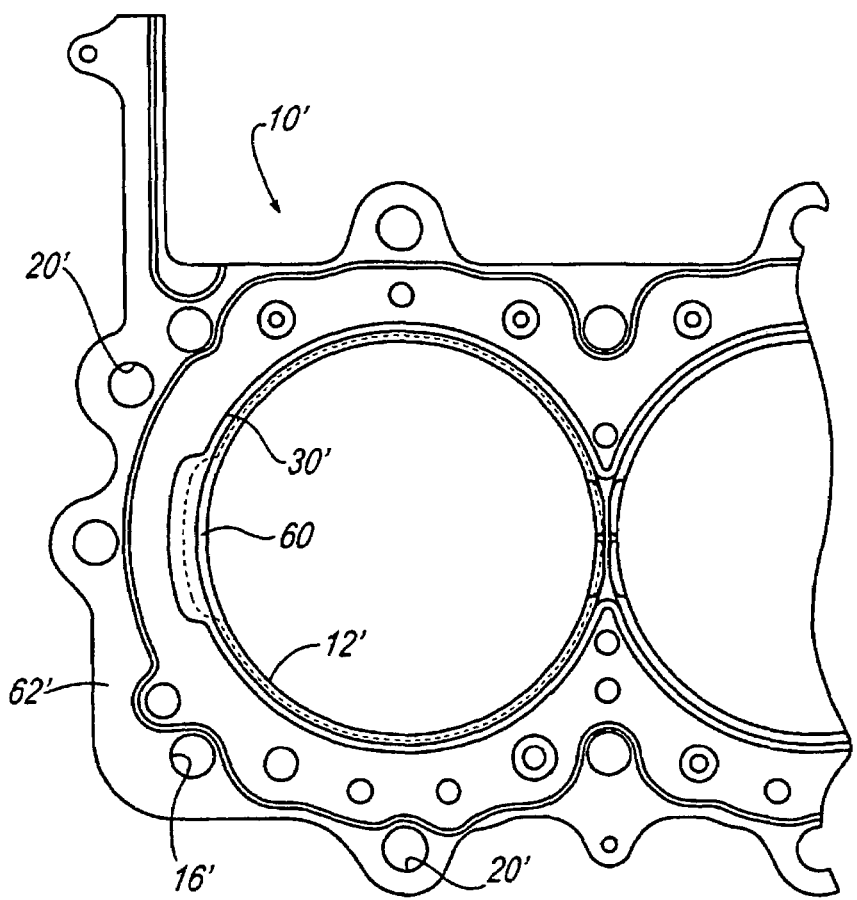
FIG. 6 is a plan view of a fragmentary portion of an alternate embodiment of an MLS cylinder head gasket that includes an overlapping integral stopper layer at an edge of a cylinder bore outside of and apart from the reduced thickness web area between bores.

Finally, referring to FIG. 6, an alternate embodiment of the gasket 10' incorporates a pad 60 that overlaps an intermediate plate 30' at an end of the cylinder bore 12'. The pad 60 is thus situated at the edge 62 of the gasket 10'. Those skilled in the art will appreciate that this particular area is another region on the circumference of the aperture edge 22' particularly suited for such a stopper inclusion in certain gasket applications (e.g. racing engine designs). The described selective stopper pad approach (as compared to the entire bore circumference surrounded by stopper metal, as in some prior art applications) is simple to design, and avoids undesirable splitting during the stopper folding steps of gasket manufacture.

In the described embodiment, the metal employed for the top and bottom layers 32 and 34 of the gasket 10 were 301 SAE stainless steel. The interposed spacer layer 30 was formed of 409 stainless or zinc plated low carbon steel.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A gasket comprising: a plurality of attached plates constructed substantially of metal to form metallic layers wherein each layer has an aperture that is aligned and mated with like apertures of adjacent layers; wherein said plurality of attached metallic layers include at least an intermediate layer; a bottom layer having flanged portions extending upwardly and wrapping around an aperture edge of said intermediate layer, wherein said flanged portions partially overlap an upper surface of said intermediate layer adjacent said aperture edge; and a top layer overlying said intermediate layer and said overlapping flanged portions of said bottom layer, wherein said overlapping flanged portions are discontinuous about said aperture.

2. A gasket, as in claim 1, wherein said overlapping flanged portions comprise stopper layers that together with the intermediate, bottom and top layers comprise a partial four-layer gasket structure between said mated apertures.

3. A gasket, as in claim 1, wherein said overlapping flanged portions include at least one wave.

4. A gasket, as in claim 1, wherein said apertures are cylinder head combustion bores and said overlapping flanged portions are limited to aperture edges of web areas situated between cylinder head combustion bores.

5. A gasket, as in claim 1, wherein said intermediate layer includes at least one sealing bead.

6. A gasket, as in claim 5, wherein said overlapping flanged portions comprise stoppers for limiting compression of said sealing bead.

7. A gasket, as in claim 3, wherein said at least one wave is a projection extending linearly outwardly from a generally flat surface of said flanged portions of said bottom layer.

8. A gasket, as in claim 3, wherein said at least one wave includes a plurality of cyclically repeating projections.

9. A gasket, as in claim 1, wherein said bottom layer and said flanged portion have a generally uniform thickness.

10. A gasket, as in claim 1, further including a spacing positioned between said top layer and said intermediate layer at said aperture edges.

11. A gasket comprising:
a plurality of attached layers;
wherein each layer has an aperture that is aligned and mated with like apertures of adjacent layers;
wherein said plurality of attached layers include at least an intermediate layer;
a bottom layer having flanged portions extending upwardly and wrapping around an aperture edge of said intermediate layer; and a top layer;
wherein said flanged portions partially overlap an upper surface of said intermediate layer adjacent said aperture edge;
wherein said overlapping flanged portions are discontinuous about said aperture; and
wherein said top layer overlies said intermediate layer and said overlapping flanged portions of said bottom layer.

12. A gasket comprising:
a plurality of attached layers;
wherein each layer has an aperture that is aligned and mated with like apertures of adjacent layers;
wherein said plurality of attached layers include at least an intermediate layer, a bottom layer having flanged portions extending upwardly and wrapping around an aperture edge of said intermediate layer; and a top layer;
wherein said flanged portions partially overlap an upper surface of said intermediate layer adjacent said aperture edge;
wherein said apertures are cylinder head combustion bores and said overlapping flanged portions are limited to aperture edges of web areas situated between cylinder head combustion bores; and
wherein said top layer overlies said intermediate layer and said overlapping flanged portions of said bottom layer.

13. A gasket, as in claim 3, wherein said at least one wave includes a plurality of waves having alternating peaks and valleys formed in both surfaces of said flanged portion.

14. A gasket, as in claim 11, wherein said overlapping flanged portions comprise stopper layers that together with the intermediate, bottom and top layers comprise a partial four-layer gasket structure between said mated apertures.

15. A gasket, as in claim 11, wherein said intermediate layer includes at least one sealing bead.

16. A gasket, as in claim 12, wherein said overlapping flanged portions comprise stopper layers that together with the intermediate, bottom and top layers comprise a partial four-layer gasket structure between said mated apertures.

17. A gasket, as in claim 12, wherein said intermediate layer includes at least one sealing bead.

* * * * *